United States Patent [19]
Picard

[11] Patent Number: 5,426,595
[45] Date of Patent: Jun. 20, 1995

[54] PORTABLE AUTONOMOUS DEVICE FOR THE DETECTION AND RECORDING OF RANDOMLY OCCURRING PHENOMENA OF SHORT DURATION

[75] Inventor: Jean-Michel Picard, Antony, France

[73] Assignee: Bureau D'Etudes Fabrications Instrumentation de Controle, Rungis, France

[21] Appl. No.: 1,517

[22] Filed: Jan. 6, 1993

[30] Foreign Application Priority Data

Jan. 7, 1992 [FR] France ............... 92 00052

[51] Int. Cl.⁶ .................................. G04F 5/00
[52] U.S. Cl. ............................ 364/569; 364/550; 364/508; 364/707
[58] Field of Search ............... 364/552, 551.01, 508, 364/566, 550, 569, 707; 346/33 D

[56] References Cited

U.S. PATENT DOCUMENTS

| | | | |
|---|---|---|---|
| 4,745,564 | 5/1988 | Tennes et al. | 364/550 X |
| 4,862,394 | 8/1989 | Thompson et al. | 364/551.01 OR |
| 5,175,845 | 12/1992 | Little | 395/550 OR |

FOREIGN PATENT DOCUMENTS

| | | |
|---|---|---|
| 2818572 | 11/1978 | Germany. |
| 3306813 | 8/1984 | Germany. |
| 3643203 | 6/1988 | Germany. |
| 9117447 | 11/1991 | WIPO. |

*Primary Examiner*—Emanuel T. Voeltz
*Assistant Examiner*—Kamini S. Shah
*Attorney, Agent, or Firm*—Browdy and Neimark

[57] ABSTRACT

The device of the invention uses at least one measurement chain comprising a sensor sensitive to the magnitude that one wishes to monitor, an analog-to-digital converter capable of supplying a digital signal representative of said magnitude, a microcontroller adapted for taking samples of said digital signal, of associating them with information enabling them to be time-stamped and of memorizing them in a memory that can be accessed by a read module, a logic reactivation circuit making it possible to command an operating period of the microcomputer when the sensor emits a signal announcing the occurrence of a monitored phenomenon. The invention applies particularly to the detection and recording of shocks which may affect goods during transportation thereof.

7 Claims, 4 Drawing Sheets

PORTABLE AUTONOMOUS DEVICE FOR THE DETECTION AND RECORDING OF RANDOMLY OCCURRING PHENOMENA OF SHORT DURATION

BACKGROUND OF THE INVENTION

1. Field of the Invention

This invention relates to a portable autonomous device for the detection and recording, during relatively long periods of time, of magnitudes representative of randomly occurring phenomena of short duration.

It applies notably, but not exclusively, to the detection and recording of shocks capable of affecting objects such as goods, during transportation and/or handling thereof.

Of course, such a detection can notably serve to subsequently reveal the cause of a deterioration of the object monitored and the moment (time stamping) at which the shock that caused this deterioration occurred. This information enables e.g. determination of who is responsible for the damage thus caused and can therefore constitute elements that are particularly useful to insurance companies, or even to the law.

It is clear that within the scope of such an application, a device of this type must have considerable autonomy, while having as small a bulk as possible. Moreover, it must be perfectly tight, shock-resistant and be capable of operating under difficult conditions (high and low temperatures). It must also be completely inviolable (the memorized information must only be read by autorized persons and must be protected against all forms of destruction).

2. Description of the Prior Art

Given these imperatives, continuous detection of the magnitude to be monitored and periodical memorizing of samples representative of this magnitude are excluded. In fact, the power consumption specific to this type of operating is relatively high and does not enable both good autonomy and a low volume to be obtained.

This is due to the fact that even in the case where one has, for the detection of the magnitudes to be measured, sensors that consume little electrical power (such as e.g. the capacitive accelerometers used for the detection of the shocks), the microcontroller necessarily used to ensure the operating sequences consumes too much electricity when operated continuously.

With a view to solving this problem, the invention works from the observation that in the applications concerned by the invention, the phenomena to be detected:

do not occur frequently (in theory, they should not occur at all), occur during a relatively short though not inconsiderable period of time.

OBJECT OF THE INVENTION

The invention thus puts these characteristics to good account and therefore proposes a portable measurement device using at least one sensor sensitive to the magnitude that one wishes to monitor, one analog-to-digital converter capable of supplying a digital signal representative of the magnitude detected by the sensor, a microcontroller capable of taking samples of said digital signal, of associating them with information enabling them to be time-stamped and to be memorized in a memory accessible by a separate read module of said device by means of suitable communications means.

SUMMARY OF THE INVENTION

Accordingly, a device therein comprises a logic reactivation circuit capable of commanding an operating period of the microcontroller when the above-mentioned sensor emits a signal announcing the occurrence of a monitored phenomenon.

According to another feature of the invention, the microcontroller is also periodically reactivated for a time count, in order to enable time-stamping of the samples memorized.

BRIEF DESCRIPTION OF DRAWINGS

An embodiment of the invention will be described hereinafter, by way of a non limiting example, in reference to the appended drawings in which.

DESCRIPTION OF THE PREFERRED EMBODIMENTS

Figure 1:
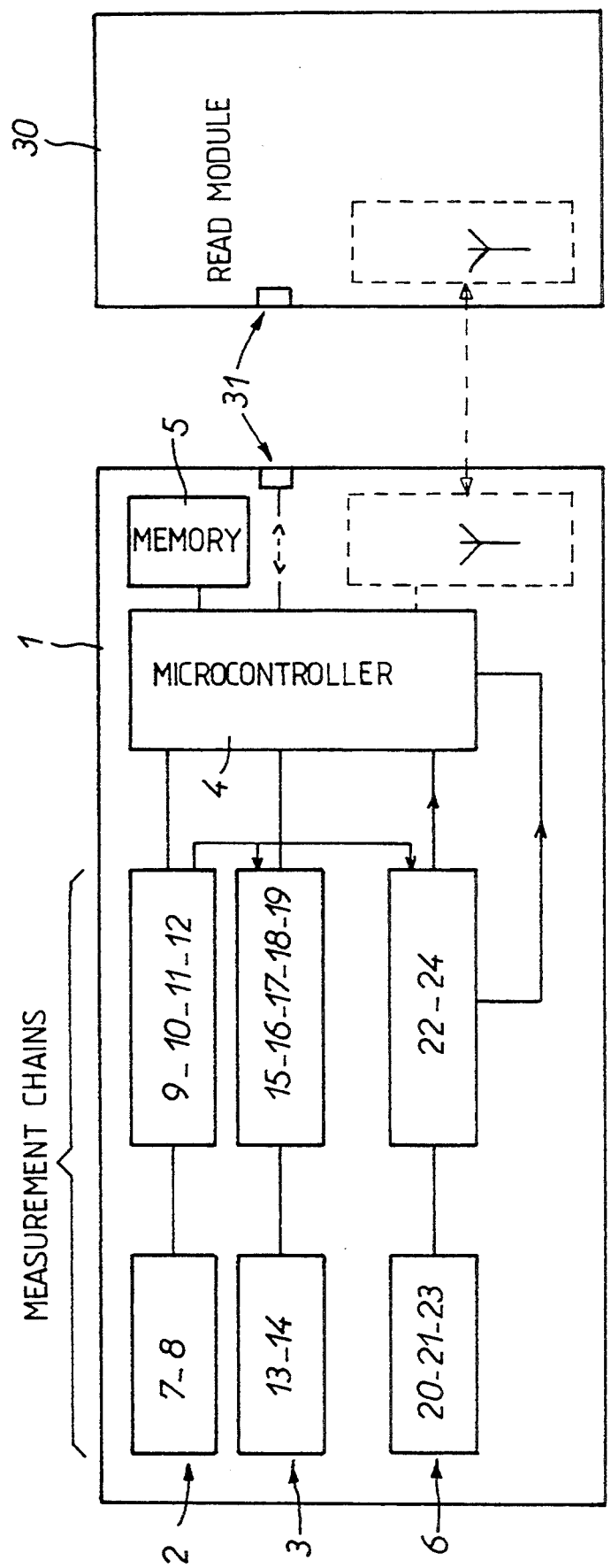
FIG. 1 is a schematic representation of a device for the detection and recording of shocks.

The device illustrated by these figures is more particularly intended for the detection and recording of the shocks undergone by a goods transportation vehicle, such as, e.g., a goods train wagon.

This device comprises, housed in a box (block 1), which is preferably tight, shock-resistant and preferably flame-retarding, two measurement chains 2, 3, managed by a microcontroller 4 associated with a memory 5 and receiving a clock signal coming from a separate clock circuit 6.

The first measurement chain comprises an accelerometer 7, preferably of the capacitive type, having a pendulum-type structure micromachined in a thin monocrystalline plate and capable of detecting accelerations of the order of ±25 g.

This accelerometer 7 is angled so as to detect the horizontal, longitudinal component of the shocks to which the vehicle is subjected. Of course, this accelerometer 7 is associated with a conditioner 8 of the conventional type which supplies an analog signal filtered successively by a low-pass filter 9 (having e.g. a cut-off frequency Fe of 40 Hz with an attenuation of 24 dB/octave) and a high-pass filter 10 (having e.g. a cut-off frequency of 0.1 Hz and an attenuation of 6 dB/octave).

The analog signal filtered at output of the high-pass filter 10 is transmitted, on the one hand, to an analog-to-digital converter 11 and, on the other hand, to a comparator with a window 12 delimited by an upper threshold and a lower threshold of e.g. ±1 g.

This threshold comparator 12 produces for each of the acceleration values included in the ±1 g window, an inhibition signal which is applied to the converter 11 while making it inactive.

In addition to its input connected to the filter 10, the converter 11 comprises a clock input connected to a clock output $P_2$ of the microcontroller 4, a serial port supplying eight-bit words (seven data bits and one sign bit) and connected to a data input P3 of the microcontroller 4 and an output for the purpose of transmitting an end-of-conversion signal to the microcontroller (port P1).

Similarly, the second measurement chain 3 comprises an accelerometric sensor 13, also of the capacitive type, angled so as to detect the vertical components of the accelerations of the vehicle. This involves detecting whether or not the vehicle is moving. This accelerometric sensor 13, which is intended to detect lesser accelerations (±2 g), is also associated with a conditioner 14 of which the output is connected to a converter 15 capable of measuring the virtual value of the acceleration detected, by means of two successive filters, i.e. a low-pass filter 16 having e.g. a cut-off frequency of 1000 Hz with an attenuation of 12 dB/octave and a high-pass filter 17 having a cut-off frequency of 30 Hz with an attenuation of 6 dB/octave.

The virtual value of the acceleration, determined by the converter 15, is applied to one of the two inputs of a comparator 18 of which the second input is connected to an output 3 of the microcontroller 4 which provides a threshold value (e.g. included between 0.01 g and 0.08 g) that can be selected by the microcontroller 4 (e.g. over three bits).

The output of this comparator 18 is applied to a logic memorizing circuit 19, also connected to the output of the comparator 12.

This logic circuit 19 carries out a sampling-blocking, at regular intervals, of the status of the output of the comparator 18. It is inhibited upon detection of a shock by a signal coming from the comparator 12.

The sequencing of the microcontroller 4 and of its auxiliary units is ensured by means of a clock comprising a quartz oscillator 20-21 of which the output, which in this instance supplies a 2.097.152 MHz frequency signal, is applied to a reactivation circuit 22 of the microcontroller 4 and to a frequency dividing circuit 23 which supplies, to a first output $S_1$, a clock signal having a period of 1 mn and, to a second output $S_2$, a clock signal having a period of 1 s.

The 1-mn clock signal is applieed to one of the three inputs of an OR gate, 24, while the 1-s clock signal is applied to the logic memorizing and updating circuit 19. The output of the OR gate 24 is connected to a control input of the logic circuit 22 which is connected by another input to an output P8 of the microcontroller 4 destined to supply a stop signal and comprises an output connected to a clock input P7 of the microcontroller 4 capable of receiving the clock signal produced by the oscillator 20-21, an output capable of supplying a control signal of a reference voltage generator 26 connected to the microcontroller 4 (port P9) and a watchdog output connected to a resetting input (port P10) of the microcontroller 4.

The operating of the previsously described circuit is then as follows:

The quartz oscillator 20-21 operates permanently. It has been specially researched for this application and is integrated in the dividing circuit 23, the OR circuit 24 and the reactivation circuit 22, in an ASIC. Its consumption is very low (a few microamperes).

The reactivation circuit 22 is designed so that the output frequency of this oscillator 20-21 is only supplied as clock frequency to the microcontroller during each of its periods of activity according to the process that will be disclosed hereinafter.

The rest of the time, this frequency does not leave the ASIC in order to reduce the consumption of the unit (for indicative purposes, it should be noted that the stray capacity of an integrated circuit prong subjected to a frequency of 2 MHz under 5 V consumes a current of approximately 10 µA).

Likewise, the two measurement chains 2, 3 operate permanently. Given the fact that the accelerometers 7, 13 used are of the capacitive type, the power consumed by these measurement chains 2, 3 is extremely low.

In the absence of shock, the acceleration signal coming from the sensor 7 remains within the window so that the comparator 12 transmits an inhibition signal which blocks the analog-to-digital converter 11, the memorizing logic 19 then being activated, and which interrupts the supply of reference voltage (block 26) to the microcontroller 4 and the transmission to the latter (port P7) of the 2.097.152 MHz clock signal produced by the oscillator 20-21 (via the OR gate, 24 and the logic circuit 22).

At the same time, the second measurement chain 3 detects, at output of the comparator 18, the stopped/-moving status of the vehicle, while the memorizing logic 19 carries out its sampling-blocking.

Periodically, the pulse of 1-mn period produced by the dividing circuit causes, via the OR circuit and the logic circuit, a furtive reactivation of the microcontroller and activation of the reference voltage source, for a time count. During this furtive reactivation, the clock signal, produced by the oscillator 20-21, is applied to the port P7.

When a shock occurs that is translated by detection by the sensor 7 of an acceleration value situated outside of the window of the comparator 12, the latter transmits an activation signal which activates the analog-to-digital converter 11 and the reference voltage source 26, and activates, by means of the application of this signal to a reactivation input (port P4) of the microcontroller 4, the putting into operation of the latter. At the same time, the memorizing logic 19 is inhibited.

The microcontroller 4 then performs a read cycle on the information present at output of the analog-to-digital converter 11 (amplitude of the shock) and at output of the logic circuit 19 (which indicates the stopped or moving status of the vehicle prior to the shock) and which memorizes this information, with an indication of the moment at which the shock occurred (by means of a reading of the time counter).

When the microcontroller 4 has completed its processing cycle, it indicates this to the logic circuit 22 by transmitting an end-of-processing signal to the port P8. The logic circuit 22 then produces a given number of clock pulses (e.g. 250) before stopping the provision thereof.

The entire device returns to the dormant status until a further shock or a further time count pulse occurs.

Figure 3:
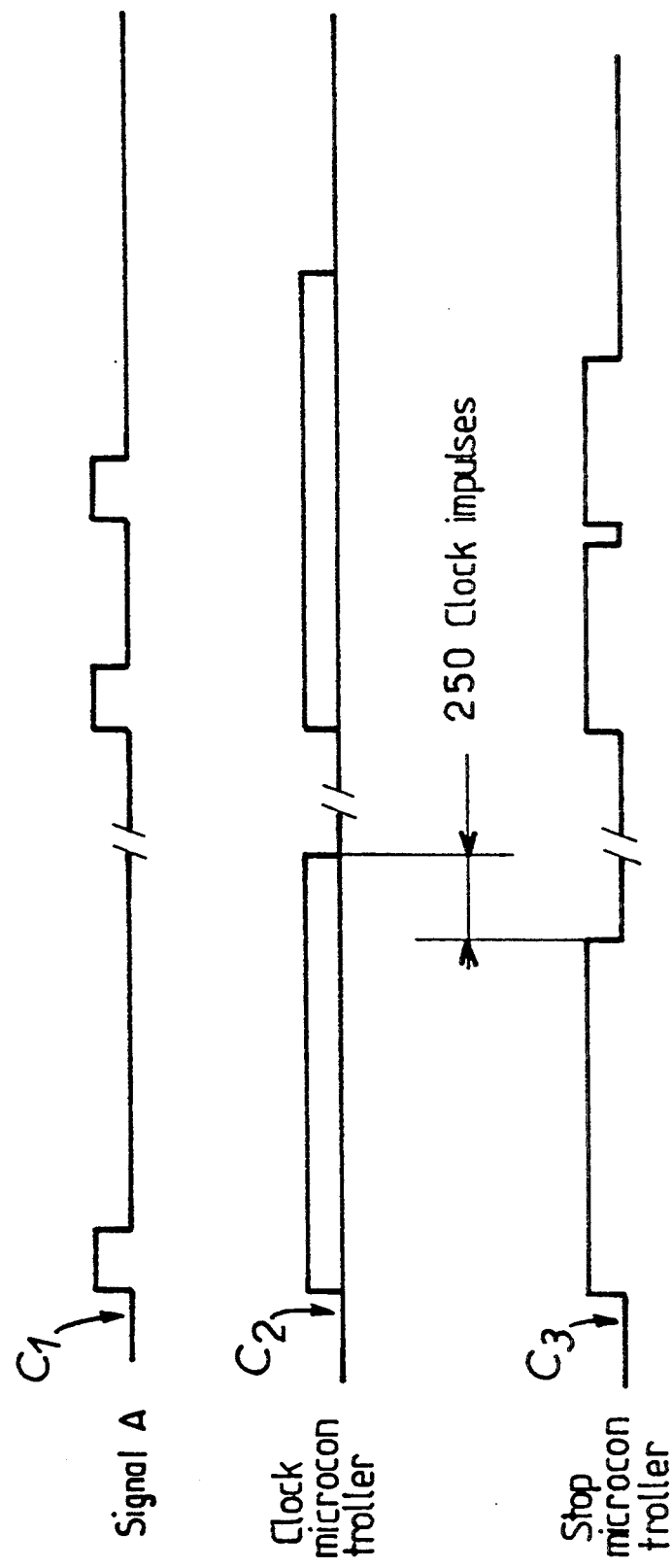
FIG. 3 is a timing diagram of the principal signals generated by the circuit represented in FIG. 2.

This process is illustrated by the timing diagram represented in FIG. 3 in which the crenellated curve $C_1$ corresponds to the signal A at output of the OR gate 24, curve $C_2$ indicating the presence or absence of the clock signal at input P7 of the microcontroller 4 and curve $C_3$ being the curve of operation (on/off) of the microcontroller 4.

A pulse of signal $C_1$ generated subsequent to a shock can be seen to cause transmission of the clock signal to the microcontroller 4. At the same time, the latter switches to the ON status for the duration of a cycle. At the end of the cycle, the microcontroller 4 switches to the OFF status. The transmission of the clock signal then ceases after 250 pulses of clock.

The reading of the memorized information by the read module is carried out by means of a reading device 30 to which the detection module may be connected, the connection then being made by means of a conventional connector 31, e.g. of type RS232.

Figure 2:
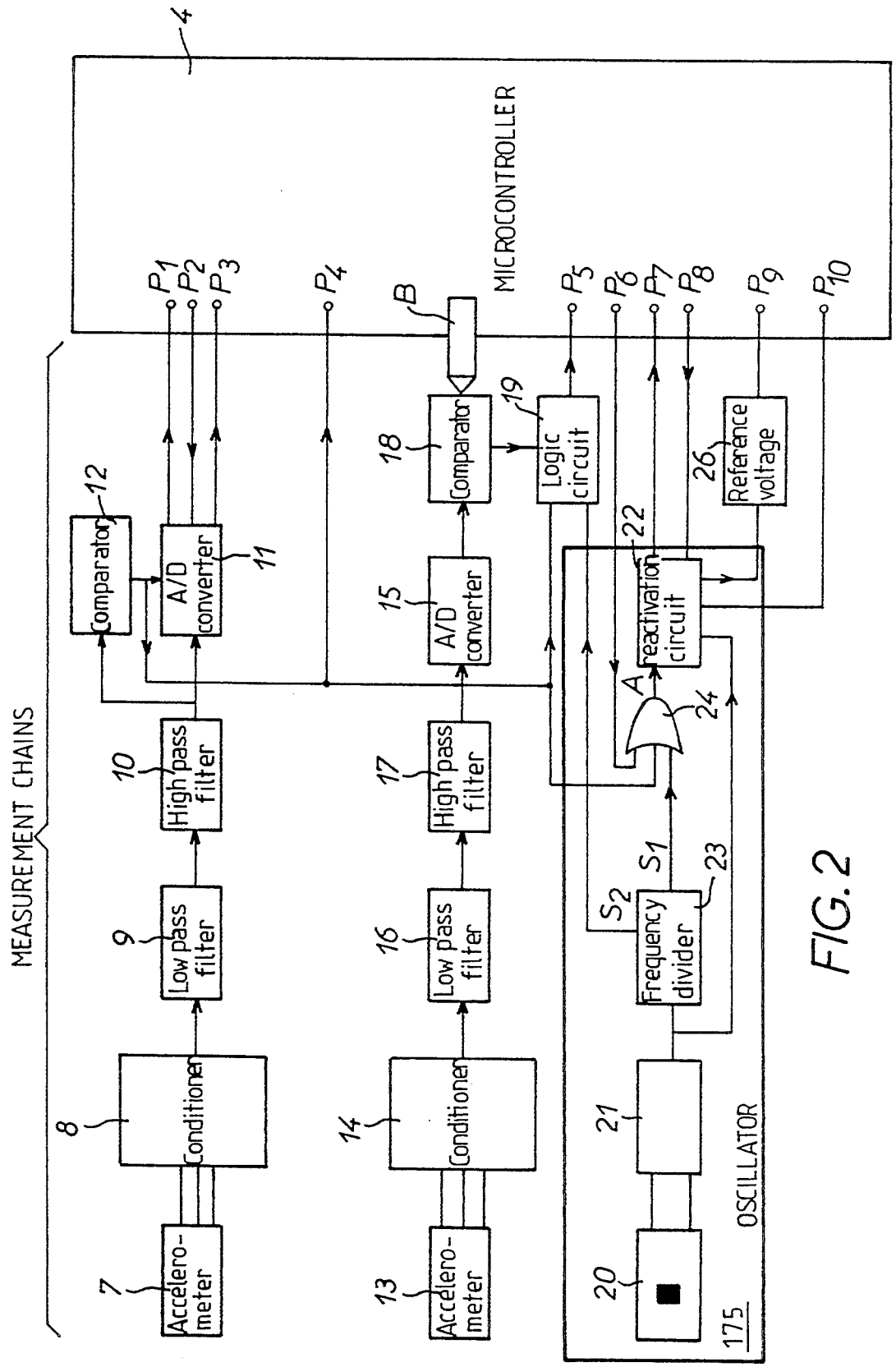
FIG. 2 is a synoptic diagram of the electronic circuit of a device of the type represented in FIG. 1.

This communication could of course be set up remotely by means of a communication system using electromagnetic, optical, sound or ultrasonic waves represented in broken lines in FIG. 2.

Figure 4:
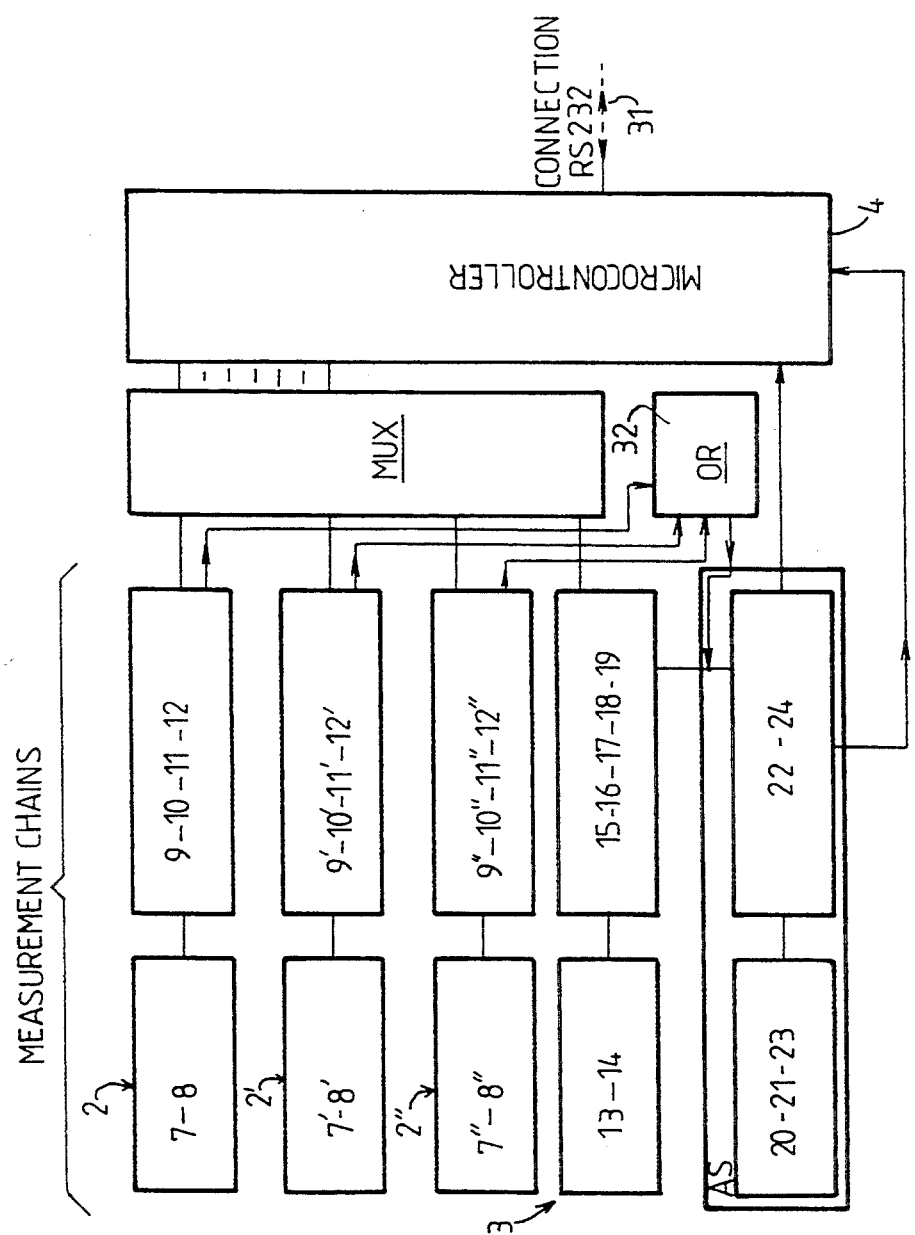
FIG. 4 is another embodiment of a device embodying the invention using three shock sensors angled perpendicularly to one another and a fourth accelerometric sensor intended to detect motion of the carrier vehicle.

In the example represented in FIG. 4, the device comprises three measurement chains similar to the measurement chain 2 illustrated in FIG. 1.

Each of these chains 2, 2', 2" therefore comprises an accelerometer 7, 7', 7", a conditioner 8, 8', 8", a low-pass filter 9, 9', 9", a high-pass filter 10, 10', 10", an analog-to-digital converter 11, 11', 11" and a window comparator 12, 12', 12". The accelerometers 7, 7', 7" are respectively sensitive along axes, X, Y, Z perpendicular to one another.

This device also comprises a fourth measurement chain identical to chain 3 represented in FIG. 1 and which comprises a sensor 13, a conditioner 14, high-pass and low-pass filters 16, 17, a virtual value computing cirucit 15, a threshold comparator 18 and a logic memorizing circuit 19.

Unlike the embodiment represented in FIG. 2, the outputs of the analog-to-digital converters 11, 11', 11" are not directly connected to the microcontroller but via a multiplexer MUX.

As for the inhibition outputs of the window comparators 12, 12', 12", they are connected to the reactivating circuit 22 by means of an OR circuit 32 separate from the OR circuit 24 contained in the ASIC A$_S$ and of which the output is connected to an inhibiting circuit of the analog-to-digital converters 11, 11', 11". This inhibiting circuit can include a flip-flop (not represented) which is reset by the microcontroller via the multiplexer MUX.

The operation of this device is similar to that previously described, except that subsequent to reactivation of the microcontroller 4, the scanning of the measurement chains is performed sequentially by means of the multiplexer MUX.

It should be stressed that due to the arrangements previously described and to the fact that the oscillator 20-21 operates permanently, though the clock signal it produces does not leave the ASIC A$_S$ outside of the reactivation period, a minimal consumption of the unit is obtained while enabling the microcontroller to be active within a few microseconds of detection of a shock.

I claim:

1. A portable autonomous device for detecting and recording, during relatively long periods of time, physical quantities representative of randomly occurring phenomena of short duration, said device using at least one first measurement chain comprising a sensor sensitive to a physical quantity to be monitored, an analog-to-digital converter capable of supplying a digital signal of said physical quantity detected by the sensor, a threshold comparator designed to emit an activation signal when the quantity detected by the sensor meets a threshold condition, and a microcontroller connected to a clock circuit by means of a logic reactivation circuit, said microcontroller effecting operating sequences during each of which it takes samples of said digital signal, associates these samples with information enabling them to be time-stamped and memomrizes said samples, along with their associated information, in a memory that can be accessed by a read module separate from said device, by means of suitable communication means, said clock circuit operating permanently and said logic reactivation circuit being designed to apply to said microcontroller said clock signal produced by the clock circuit during first and second limited periods of time between which said microcontroller is stopped, said first periods of time comprising one of said operating sequences and starting when said threshold comparator emits said activation signal, and said second periods of time being triggered subsequent to transmission by said logic reactivation circuit of a reactivation signal which causes a furtive reactivation of said microcontroller for performing a time count, said comparator being external with respect to said microcontroller and said clock circuit being integrated with said reactivation circuit into an ASIC.

2. The device as claimed in claim 1, wherein said sensor is an analog sensor and is connected, by means of filtering circuits, on the one hand, to said analog-to-digital converter and, on the other hand, to said threshold comparator which inhibits said converter when the values detected are included within a given range of values.

3. The device as claimed in claim 1, wherein it comprises a second measurement chain capable of detecting a second physical quantity and a means enabling the memorizing of information relating to this quantity in relation with the memorizing of said samples.

4. The device as claimed in claim 3, wherein said second measurement chain comprises an analog sensor, a means enabling determination of a virtual value of the signal emitted by the sensor and a comparator capable of comparing said virtual value to a given threshold value and of emitting a binary signal constituting said information.

5. The device as claimed in claim 2, wherein it comprises three measurement chains identical to said first chain and comprising three analog-to-digital converters and three window comparators connected to said microcontroller by means of a multiplexer each of said window comparators comprising an inhibition output connected to said logic reactivation circuit by means of an OR circuit.

6. The device as claimed in claim 1, wherein said microcontroller comprises a means enabling the generation, at the end of its operating sequence, of an end-of-processing signal which causes interruption of the transmission of said clock signal by said logic reactivation circuit.

7. The device as claimed in claim 1, wherein the above-mentioned sensors consist in capacitive accelerometers.

* * * * *